United States Patent [19]

Balzer et al.

[11] 4,149,042
[45] Apr. 10, 1979

[54] MODULATED RF CARRIER DISTRIBUTING ARRANGEMENT FOR KEY TELEPHONE LINE CIRCUITS

[75] Inventors: Gerry C. Balzer, Freehold; Alexander Feiner, Rumson, both of N.J.

[73] Assignee: Bell Telephone Laboratories, Incorporated, Murray Hill, N.J.

[21] Appl. No.: 846,144

[22] Filed: Oct. 27, 1977

[51] Int. Cl.² ............................................ H04M 1/72
[52] U.S. Cl. ..................................................... 179/99
[58] Field of Search ...................... 179/1 B, 2.5 R, 99, 179/2.5 B

[56] References Cited

U.S. PATENT DOCUMENTS

| | | | |
|---|---|---|---|
| 3,246,082 | 4/1966 | Levy | 179/1 |
| 3,400,221 | 9/1968 | Wolters | 179/2.5 R |
| 3,794,774 | 2/1974 | Kemmerly et al. | 179/81 R |
| 3,895,192 | 7/1975 | Angner et al. | 179/99 |
| 3,925,625 | 12/1975 | Angner et al. | 179/99 |
| 3,965,308 | 7/1976 | Jones et al. | 179/99 |
| 4,013,840 | 3/1977 | Anderson | 179/2.5 R |
| 4,056,695 | 11/1977 | Angner et al. | 179/99 |
| 4,066,847 | 1/1978 | Giordano | 179/99 |

*Primary Examiner*—William C. Cooper
*Assistant Examiner*—Randall P. Myers
*Attorney, Agent, or Firm*—David H. Tannenbaum

[57] ABSTRACT

A modulated RF carrier signal distributing arrangement, utilizing existing line circuits, is disclosed for providing entertainment signals to key telephone lines in the active noncommunicating (hold) state. The disclosed system utilizes an existing option connector on the line circuit for connection of a music receiver circuit. A centrally located transmitter circuit frequency modulates its own RF carrier with an externally supplied music signal and is wired to the existing common dc power to distribute the modulated RF signals to the receiver via the option connector on each line circuit. The receiver circuitry demodulates the RF signal and couples the resulting music signal directly across the hold bridge leads of the associated line.

27 Claims, 7 Drawing Figures

MUSIC RECEIVER (MRI)

MODULATED RF CARRIER DISTRIBUTING ARRANGEMENT FOR KEY TELEPHONE LINE CIRCUITS

FIELD OF THE INVENTION

This invention relates to a system for providing music-on-hold signals to a key telephone line circuit.

BACKGROUND OF THE INVENTION

When a communication path is established between a calling and called party, if one of the parties to the call is associated with a key telephone system, it is possible for the key telephone party to place the call in the active but noncommunicating (hold) mode. In this mode the communication path between the parties is maintained active but communications cannot take place. The key telephone party can, by operation of the like key, return the call to the bidirectional communication state.

In some situations it is now possible to provide some form of entertainment, usually music, to the party who has been placed on hold.

It is desirable, for economic reasons, to use the same limit circuit to serve all stations whether or not the music-on-hold feature is provided. Such a system is described in U.S. Pat. No. 4,056,695 issued to Angner et al on Nov. 1, 1977. However, the system described in the above-mentioned circuit while constituting an improvement over prior art still exhibits problems with the music-on-hold arrangement. One problem is that connection of the music-on-hold feature requires rewiring of the line card to accommodate the connection of a connectorized daughter-board music receiver card to the line card. Another problem arises such that in certain applications spare terminals on the line card are not available to wire-in the music signal and hence a separately mounted music coupler card is required, this results in additional space allocation, additional wiring and duplication of hold control logic on the music receiver card. In addition, the existing music coupler cards use passive components which exhibit limited isolation between telephone lines sharing a common music source and could also exhibit signal loading problems when too many lines share a common music source.

Thus, a need exists in the art for a music receiver circuit adapted for easy connection to the line card of the type illustrated in U.S. Pat. No. 4,056,695. A further need exists for a music receiver card which will reduce the rewiring necessary to accommodate a music-on-hold feature, as well as reduce the signal loading caused by multiple music receivers, and improve the isolation between communication lines connected to a common music source.

SUMMARY OF THE INVENTION

A modulated RF carrier distributing arrangement is disclosed which will provide a music-on-hold feature for the key telephone unit (KTU) line circuits of the type described by U.S. Pat. No. 4,056,695. The system consists of a centralized music transmitter unit and optional connectorized music receiver cards which are connected to each line card requiring a music-on-hold feature. Signal communication between the common transmitter and the music receiver cards is accomplished using the existing common dc power wiring to each line card. The music transmitter unit frequency modulates an internally generated RF carrier with a customer provided music signal. The frequency modulated (FM) signal is then applied to a common dc power supply lead and distributed to the line cards. The FM signal is used to distribute the music signals to reduce the effect of noise and signal attenuation on the quality of the music signal. The FM signal is also less likely to cause interference with normal telephone operation while at the same time being susceptible to being superimposed on the dc supply lead to circumvent the connector pin limitation problem of the existing line card.

The music receiver is constructed as a connectorized daughter-board which mates with the existing option connector on the line card. The existing option connector has dc power and ground voltages available in addition to leads connected across the existing hold impedance. The music receiver obtains dc power as well as the FM signal over the power lead and then demodulates the received signal which is then applied directly across the hold impedance of the line card. The music receiver contains an FM demodulator and amplifier circuit with hold control switching being provided by the existing line card. Hence, the providing of a music-on-hold feature for the line card is accomplished by merely plugging-in a music receiver card into the existing option connector of the line card. The only wiring necessary is in the installation of the common music transmitter unit.

Isolation between the telephone lines is assured by the unidirectional nature of the receiver units. In addition, the received music signal level is uneffected by changes in the number of receiver units connected to the transmitter unit.

Accordingly, it is a feature of our invention to provide an optional music-on-hold capability without rewiring existing line cards.

Another feature of our invention is to provide total isolation between telephone lines which are receiving music-on-hold signals.

Finally, it is a feature of our invention to provide a music-on-hold capability which provides a minimal loading resulting in a constant music signal independent of the number of music receiver cards connected.

BRIEF DESCRIPTION OF THE DRAWINGS

The purpose and operation of the present invention, as well as additional objectives, advantages and features thereof, will be more fully appreciated from the illustrative embodiment shown in the drawing in which.

DETAILED DESCRIPTION

General Operation

Figure 1:
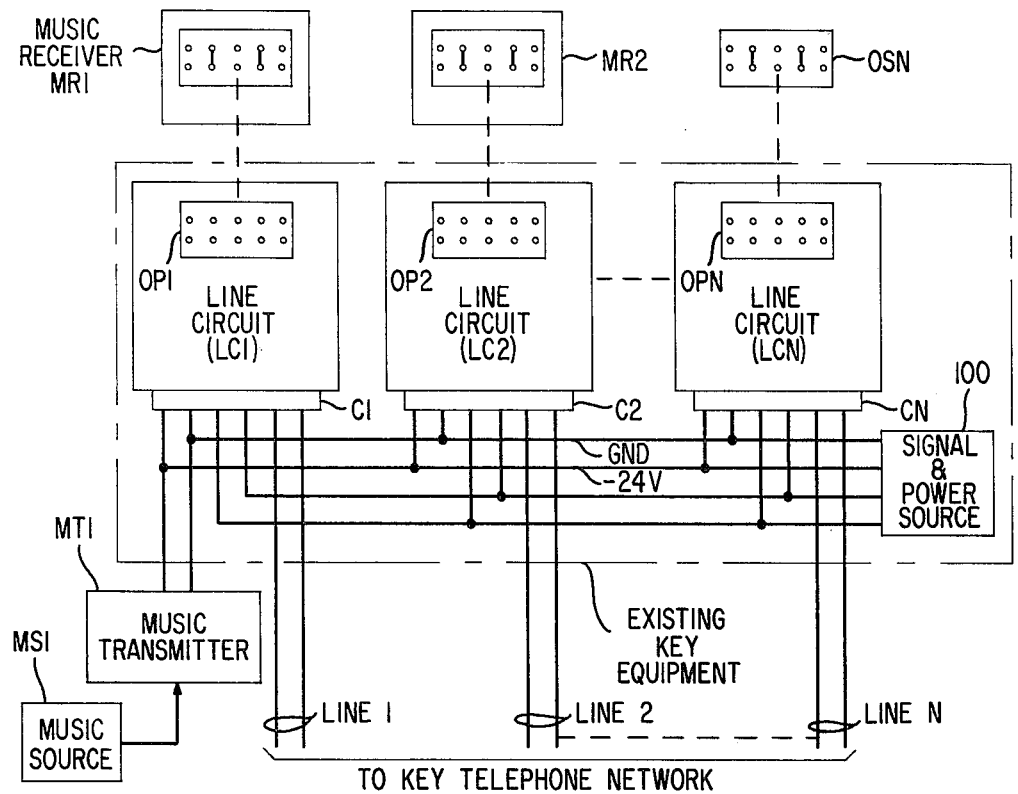
FIG. 1 shows a typical application of the invention for providing music-on-hold to multiple key telephone line circuits.
Figure 2:
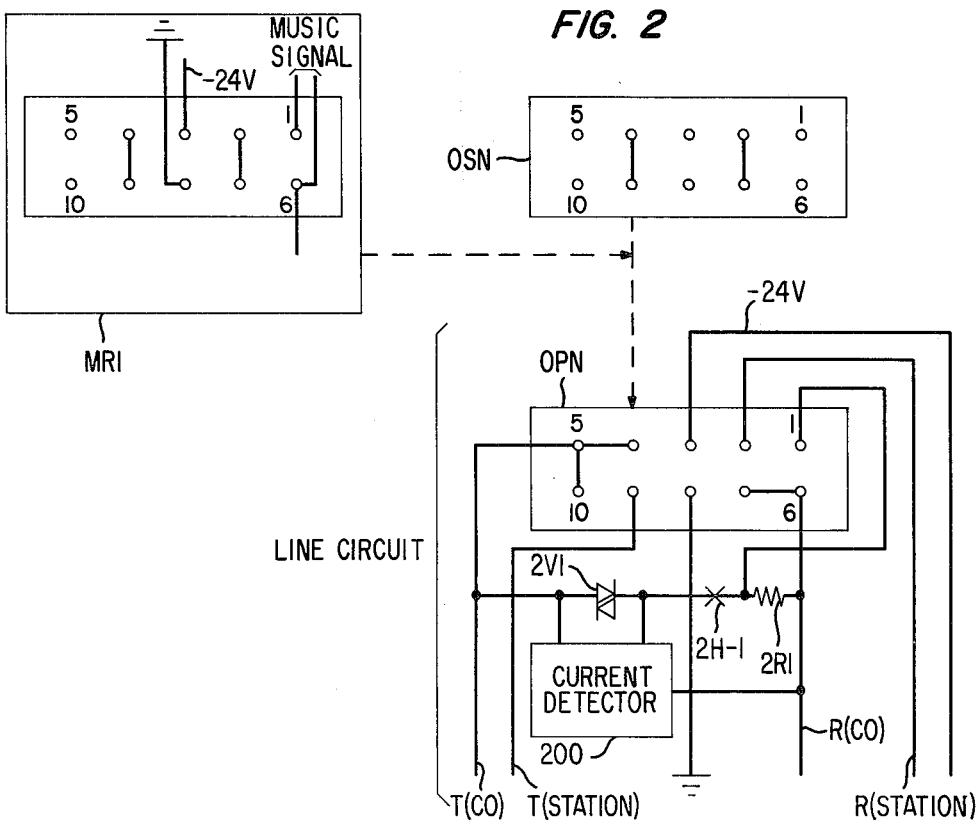
FIG. 2 shows the wiring of the existing option plug (OPN) and option socket (OSN) as well as the wiring of the music receiver (MR1) card.

Shown in FIG. 1 is a typical application of the modulated RF carrier distributing arrangement for providing music-on-hold to key telephone line circuits. The description of operation of station sets and line circuits together with a CO or PBX is well known in the telephone art, for example, see U.S. Pat. No. 3,436,488 issued to R. E. Barbato et al on Apr. 1, 1969. The operation of the line circuits LC1–LCN is described in the Angner et al pending patent application Ser. No. 708,857, now U.S. Pat. No. 4,057,693, which issued on Nov. 8, 1977, as U.S. Pat. No. 4,057,693 is incorporated herein by reference. The identical line circuits, LC1–LCN of FIG. 1, are plug-in connectable to connectors C1–CN which are wired to the signal and power unit 100 and the associated key telephone network. In key telephone applications not requiring a music-on-hold feature each line circuit, such as line circuit LCN, would be equipped with an option socket, such as option socket OSN, plugged into the option plug, such as option plug OPN, to provide the proper cross-connection of signal leads. As shown in FIG. 2, option socket OSN interconnects telephone leads R (station) and T (station) to R (CO) and T (CO) respectively. This arrangement is more fully detailed in previously mentioned U.S. Pat. No. 4,056,695.

Returning to FIG. 1, a music-on-hold feature is provided in the disclosed system by providing music transmitter circuit MT1 which superimposes across the common −24v power and ground bus an RF carrier which is FM modulated with a music signal provided by music source MS1. This modulated carrier signal is available on the −24v power lead at each line circuit LC1–LCN. Since the −24v and ground leads are available on the option plug of each line circuit (as shown in FIG. 2), the FM signal is distributed to each music receiver card, such as music receiver card MR1 via the option plug.

As shown in FIG. 2, to equip a line circuit with the music-on-hold capability option socket OSN is removed and music receiver card MR1 is merely plugged-in at each line circuit location (LC1 and LC2 in the example of FIG. 1) requiring a music-on-hold capability.

Figure 5:
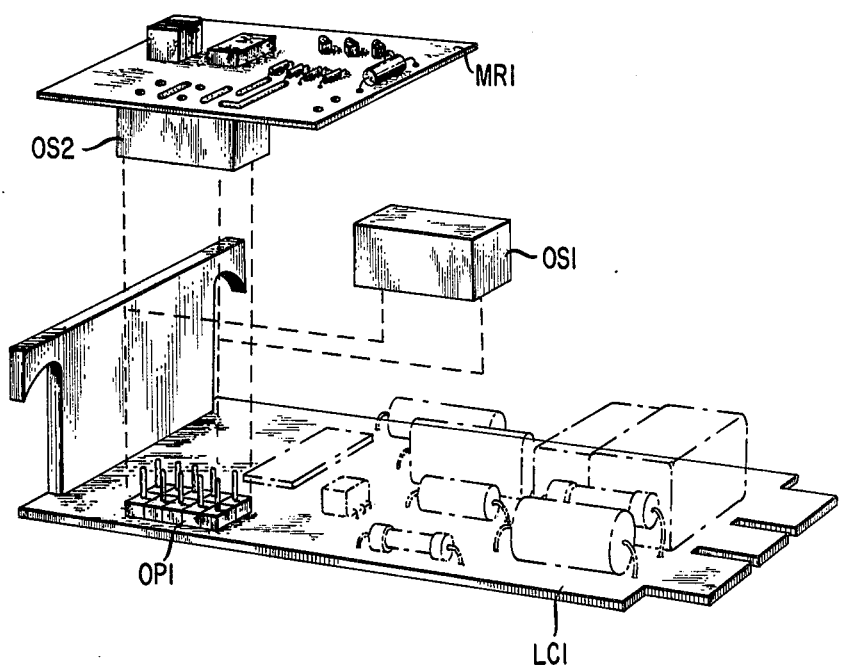
FIGS. 5 and 6 show perspective views of the line circuit (LC1), option socket (OS1) and the music receiver (MR1) card.

FIG. 5 illustrates how music receiver card MR1 plugs into a line card. The music receiver card MR1 derives power and RF signals from the −24v and ground leads. Once the FM signal is separated from the −24v dc voltage it is demodulated, amplified and the resulting music signal is connected across pins 1 and 6 of the option socket.

As shown in FIG. 2, pins 1 and 6 of the option plug (OPN) are wired across hold resistance 2R1 of the associated line circuit. Hence, the music signal is constantly applied across hold resistor 2R1 and will be applied to tip T (CO) and ring R (CO) leads of the central office (CO) pair whenever relay contact 2H-1 is closed. Relay contact 2H-1 closes when the line circuit hold relay (not shown) is operated in response to a signal from shunt current detector 200 when a hold condition is requested by the telephone user. The operation of shunt detector 200 is described in the Angner et al pending application Ser. No. 708,857. Thus, as shown in FIG. 2, during the hold condition the music signal proceeds from music receiver MR1 to pin 6 and hence to lead R (CO) via pin 6 of OPN. The other terminal of the music receiver connects to pin 1 of the MR1 and hence through pin 1 of OPN to the junction of resistor 2R1 and make contact 2H-1. Since the telephone line is in the hold condition, make contact 2H-1 is shorted and hence the music signal is supplied via varistor 2V1 to lead T (CO). The music signal, being across leads R (CO) and T (CO), is connected through the CO to the party on hold. When the hold condition is released, relay contact 2H-1 prevents music signals from being applied across leads T (CO) and R (CO).

Music Transmitter

Figure 3:
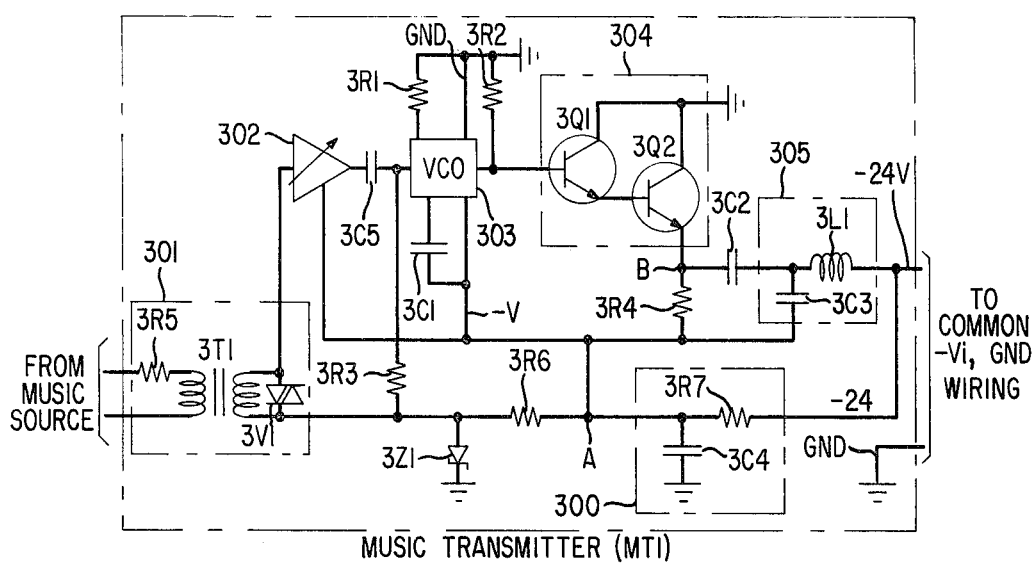
FIG. 3 shows a schematic of the music transmitter circuit.

Music transmitter MT1 shown in FIG. 3 is merely illustrative of circuits known in the art which will perform adequately as a modulated music transmitter. A frequency modulated (FM) mode of operation is used, rather than amplitude modulation (AM), to reduce the effects of noise and signal attenuation on the quality of the distributed music signals. An FM signal is also less likely to produce audible interference with normal telephone operation.

As shown in FIG. 3, the output of music transmitter MT1 is connected across the −24v and ground voltage leads. The −24v volt and ground voltage leads are common to all the key telephone line circuits as shown in FIG. 1. The dc power filter 300 of FIG. 3, comprised of resistor 3R7 and capacitor 3C4, filters any noise or music signals on the −24 volt supply. The resultant dc voltage at node A is used to bias amplifier 302, voltage controlled oscillator (VCO) 303, amplifier 304 as well as provide a reference voltage for VCO 303 through resistor 3R6 and zener diode 3Z1. Music source MS1, shown in FIG. 1, supplies the music signal which is connected via coupler 301, of FIG. 3, to music transmitter MT1. Coupler 301 is comprised of resistor 3R5, transformer 3T1 and varistor 3V1. Transformer 3T1 provides isolation and varistor 3V1 limits and protects music transmitter MT1 from any over voltage signals or surges. Amplifier 302 provides adjustable voltage gain to set the proper level of music signal into VCO 303. The output signal from amplifier 302 is coupled via capacitor 3C5 to the input of VCO 303. Resistor 3R3 provides a reference dc bias voltage to the input of VCO 303. Voltage controlled oscillator 303 is a device whose frequency of oscillation is dependent upon input voltage deviation about a fixed reference dc voltage. Many integrated circuits are commercially available which would provide the VCO function, the Signetics NE566 function generator is typical of circuits commonly available. A more detailed description of the operation of a function generator is available in the Signetics digital, linear MOS applications handbook, 1974 edition.

The frequency of oscillation ($f_o$) of VCO 303 is inversely proportional to the product of an external resistor ($R_f$) 3R1 and capacitor ($C_f$) 3C1 as described by the formula $$f_o \approx (1/KR_fC_f) \qquad (1)$$

where K is a constant determined from VCO bias conditions. The frequency of operation of VCO 303 is chosen to minimize RF radiation and interference and yet result in a reasonable RF impedance to ground across the −24 volt supply. Thus, adequate RF voltage can be developed across this relatively low RF impedance with a simple driving circuit. The output of VCO 303 is connected to a low output impedance line driving amplifier (304).

As illustrated in FIG. 3 output amplifier 304 is comprised of two transistors 3Q1 and 3Q2 connected as a Darlington-pair. Resistor 3R2 provides bias voltage to the base of transistor 3Q1 and resistor 3R4 provides bias to the emitter of transistor 3Q2. The Darlington-pair, transistors 3Q1 and 3Q2, provide a low output impedance at node B to drive the low RF impedance −24v line. Capacitor 3C2 couples signals from the emitter of transistor 3Q2 to impedance matching network 305 which is comprised of capacitor 3C3 to ground and inductor 3L1 in series with the −24 volt line.

As mentioned previously, the function blocks 300, 301, 302, 303, 304 and 305 are merely illustrative and many variations of each circuit are well known in the art which will adequately provide these functions.

Music Receiver

Figure 4:
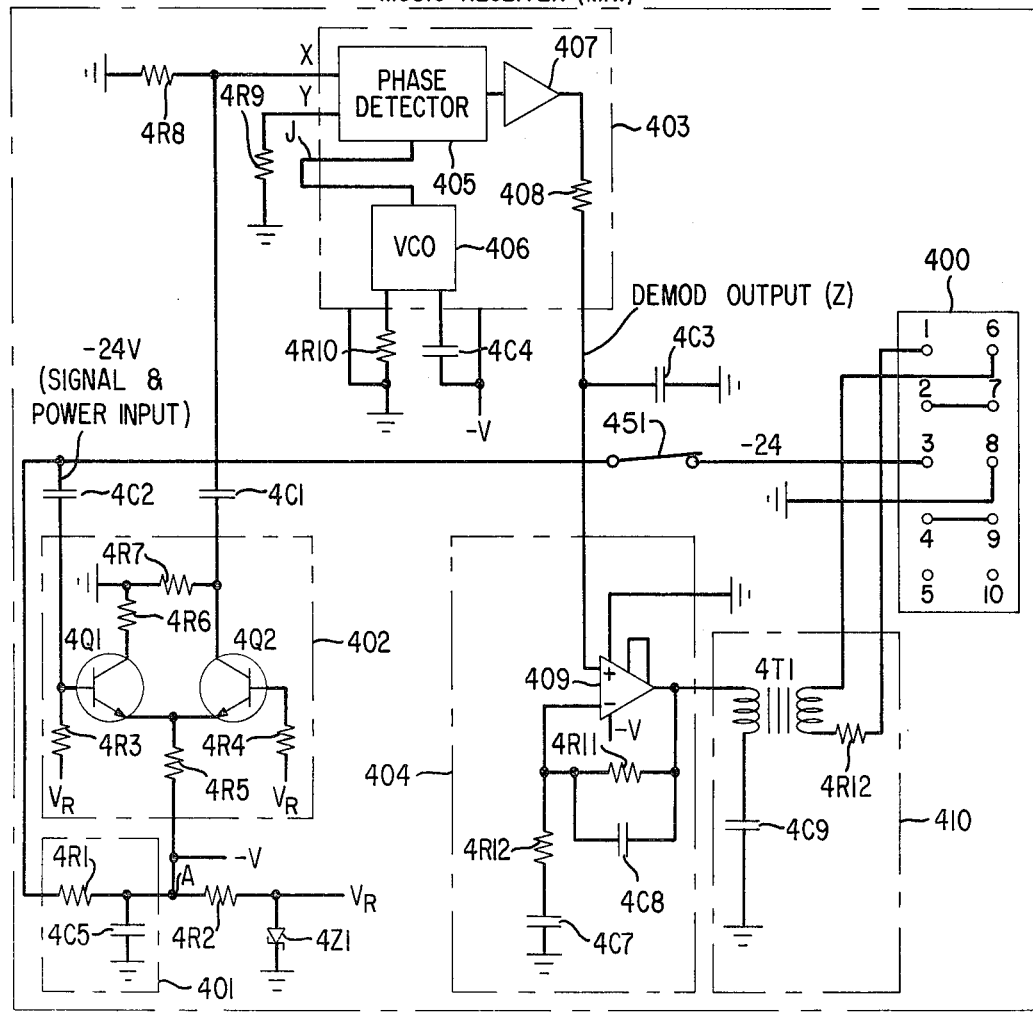
FIG. 4 shows a schematic of the music receiver circuit.
Figure 6:
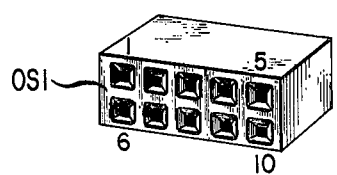

Music receiver MR1, as shown in FIG. 4, utilizes a conventional phase-locked loop arrangement for demodulation of the FM signal. As shown in FIG. 5, and as discussed above music receiver MR1 is constructed as an optional connectorized daughter-board which mates with the existing option plug OP1 of line card LC1. When no music-on-hold feature is required, option socket OS1, shown in FIG. 6, is connected to line card LC1 as shown in FIG. 5. When a music-on-hold feature is desired, option socket OS1 is removed and music receiver MR1 is connected to option plug OP1. Note, from FIG. 2 that the addition of switch 4S1 in series with the −24v lead could be used to disable the music signal and hence enable music receiver MR1 to also function as option socket OSN.

Referring again to FIG. 4, option socket 400 is wired to mate with option plug OPN of FIG. 2 with pin 2 connected to pin 7 and pin 4 connected to pin 9. In addition, pin 8 is connected as the ground terminal and pin 3 as the −24 volt terminal. The output of music receiver MR1 is connected across pins 1 and 6 of option socket 400. The −24 volt dc is separated from the FM signal by power filter 401 which includes series resistor 4R1 and capacitor 4C5 to ground. The resulting dc voltage −V at node A is used to bias differential amplifier 402, phase locked loop 403 and output amplifier 404. Reference voltage VR, derived from node A using resistor 4R2 and zener diode 4Z1, is used to bias differential amplifier 402.

The music signal appearing on the −24 volt dc lead from common music transmitter MT1 is coupled, via capacitor 4C2, to differential amplifier 402 comprised of transistors 4Q1, 4Q2 and associated bias resistors 4R3 through 4R7. Differential amplifier 402 is biased at reference voltage VR and has enough gain to provide voltage limiting. The limiting provides the benefits of reducing any amplitude modulation or noise on the signal and establishing a fixed signal level to drive phase detector 405 of phase locked loop 403. Differential amplifier 402 has a high input impedance such that connection of multiple music receivers (MR1 and MR2) will not load down common music transmitter MT1 or otherwise affect the operation of this music-on-hold distributing arrangement. Loading effects are also diminished because of the low output impedance of music transmitter MT1. In addition, the unilateral operation of differential amplifier 402 prevents signal flow from its output to its input. Thus, the possibility of cross-coupling of voice signals between line 1 and line 2, shown in FIG. 1, during pauses in the music transmission is virtually nonexistent. In addition, a failure of music source MS1, shown in FIG. 1, will not present a cross-coupling problem since music receivers MR1 and MR2 will isolate lines 1 and 2.

Phase-locked loop 403 of FIG. 4 can be constructed using any of a number of commercially available units. The Signetics NE565 phase-locked loop is typical of the devices available and could be connected as shown in block 403 to provide the phase-lock loop function. The frequency of oscillation of voltage controlled oscillator 406 is given approximately by $$f_R \approx 1.2/(4R_f C_f) \qquad (2)$$

where $R_f$ is the value of resistor 4R10 and $C_f$ is the value of capacitor 4C4. The frequency $f_R$, of course, should be the same as center frequency $f_o$ of VCO 303 of music transmitter MT1 shown in FIG. 3 and described by equation (1).

The output of differential amplifier 402 is connected, via capacitor 4C1, to input X of phase detector 405. Phase detector 405 has a differential input and resistors 4R8 and 4R9 are of such value as to present an equal driving impedance to input terminals X and Y. VCO 406 is connected to phase detector 405 as shown by jumper J. The output of phase detector 405 connects to amplifier 407 whose output connects to a low pass filter comprised of internal resistor 408 and capacitor 4C3. This low pass filter is used to eliminate unwanted frequencies from the demodulated output Z of phase-locked loop 403. Output Z is connected to output amplifier 404. A more detailed description of the operation of phase-locked loops is available in the Signetics digital, linear MOS applications handbook, 1974 edition.

When phase-locked loop 403 is locked to the incoming signal the demodulated output Z is the desired music signal. This much signal is amplified by output amplifier 404 comprised of integrated circuit amplifier 409 and associated resistors 4R11, 4R12 and capacitors 4C7 and 4C8. The frequency response of output amplifier 404 as determined by components 4R11, 4R12, 4C7 and 4C8 provides gain only for the desired music signal. The output of amplifier 404 is connected through the primary of transformer 4T1 and capacitor 4C9 to ground. Transformer 4T1 isolates music receiver MR1 from the telephone line (central office) and applies the music signal across this telephone line such as to maintain the longitudinal balance of the line. One terminal of the secondary of transformer 4T1 is connected in series with resistor 4R12 and terminates on pin 1 of option socket 400. The second terminal of the secondary of transformer 4T1 is connected to pin 6 of the option socket 400. As shown by FIG. 2, pin 1 and 6 of the mating option plug OPN are connected across hold resistor 2R1. Hence, the music signal is connected across the telephone pairs, R (CO), T (CO) and R (station), T (station), when make contact 2H-1 is closed during a hold condition.

The design of music receiver MR1 could be implemented using a variety of electronic circuits well known in the electronics art. Music transmitter MT1 and music receiver MR1 could be designed using amplitude modulation (AM) techniques but the switching noise present on key system leads would produce significant audio noise levels when demodulated by an AM detector. Thus, to obtain equal signal quality (signal-to-noise performance) using AM transmission would require a higher signal transmission level than required for a comparable FM system. Also in an FM system the demodulated signal level is independent of the RF loss of the transmission path and so does not require an automatic gain control in the receiver as required in an AM system. Thus, in an FM system a failure of music source MS1 will result in normal line noise rather than a greatly increased noise level as with an AM system with an AGC circuit. In addition, additional audible interference could occur when AM signals are demodulated by any device nonlinearity.

Thus, although FM is not the most efficient system for overcoming noise, it is one of the easiest methods with which to implement our music transmitter MT1 and receiver MR1 units.

Other Arrangements

Figure 7:
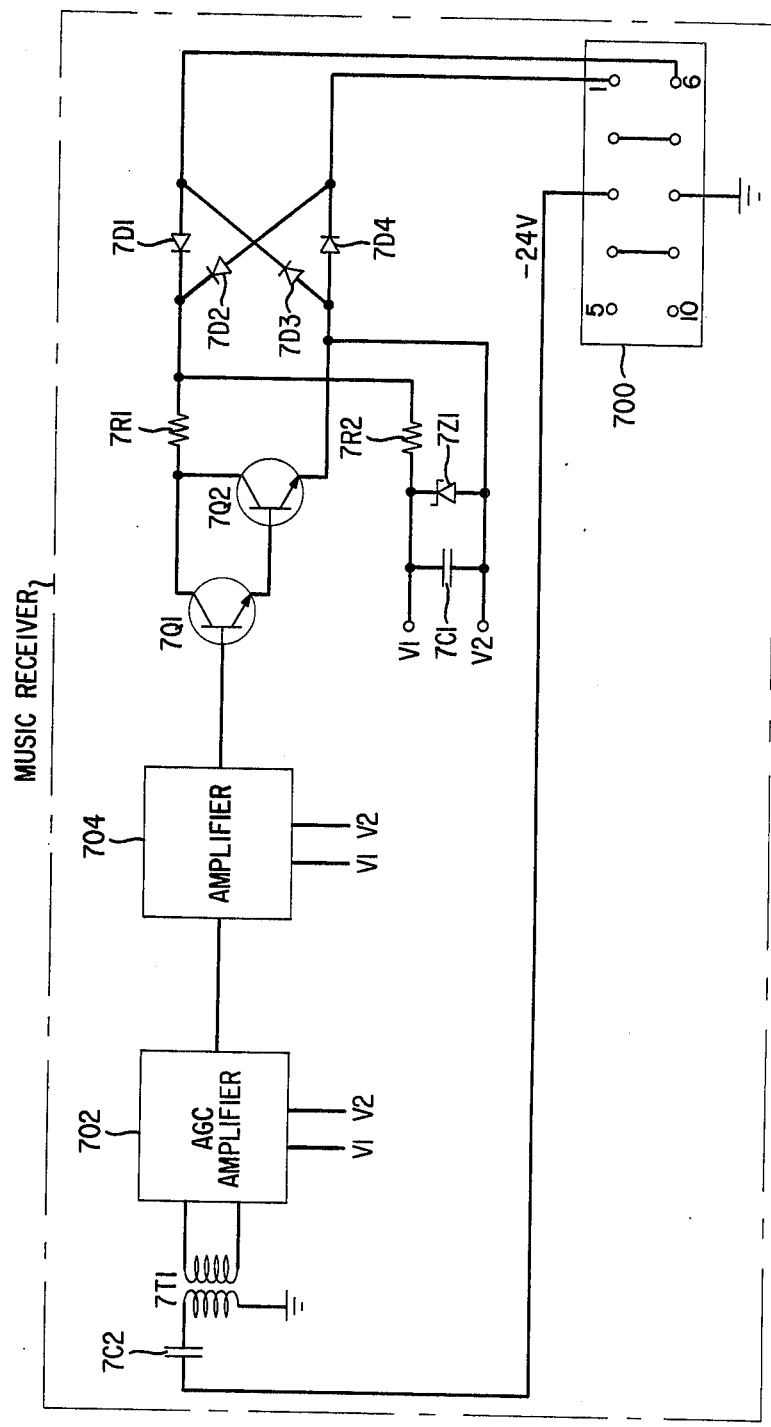
FIG. 7 shows a schematic of a line powered music receiver circuit.

Other innovations which could be made in music receiver MR1 is to power the unit from the telephone line as shown in FIG. 7. The circuit of FIG. 7 is an AM type system and requires elimination of hold resistor 2R1 of FIG. 2. Thus, dc current from the telephone line flows from pin 6 of option socket 700 through diode 7D1, resistor 7R1, transistors 7Q1 and 7Q2 and diode 7D4 back to the telephone line via pin 1 of option socket 700. These components provide a hold impedance during the hold mode. The diodes 7D1, 7D2, 7D3 and 7D4 provide a polarity guard enabling powering during voltage polarity reversals on the telephone line. Resistor 7R2, capacitor 7C1 and zener diode 7Z1 provide a power supply voltage for powering the automatic gain control (AGC) amplifier 702, and amplifier 704. Note that transformer isolation (7T1) occurs at the input with the line powered music receiver whereas in FIG. 4 transformer coupling (4T1) was at the output of the music receiver MT1. Capacitor 7C2 prevents dc current flow through transformer 7T1. Transformer 7T1 could be eliminated and replaced by a conventional RF coupling circuit at a sacrifice of signal balance.

Because of the limited voltage available across terminals V1 and V2, circuits 702 and 704 were required which would operate at voltages of approximately 1.5 volts. Because of the limited voltage avaiable an FM type system may not be functional with existing integrated circuits but a working AM type system of the type shown in FIG. 7 was made operational using a Ferranti ZN—414 integrated ciruict as the AGC amplifier 702. The ZN—414 provides RF gain, AM detection and limited AGC capability and is connected in a conventional manner described in its data sheet. Such a line powered music receiver would nicely complement a line powered line circuit and music transmitter to provide music-on-hold at key telephone locations where no outside power is avaiable. Note, a switch could be added to the music receiver to optionally disable the music feature while maintaining the operation of the music receiver as a hold impedance.

The music transmitter (MT1) of FIG. 3 and music receiver (MR1) of FIG. 4 could be designed for radio transmission and reception of music signals. This transmission within the key systems by radio eliminates the need to share existing cables, but may present additional problems. To insure adequate received signal-to-noise ratios a high field strength signal may have to be transmitted. The presence of large RF field strengths may require radio frequency interference (RFI) protection of the surrounding equipment to insure proper telephone operation. The application of a music-on-hold capability for key telephone systems using radio transmission for distributing the music signal may be practical in key systems where the rewiring or the sharing of existing leads is not possible. In addition, such a system may offer some advantages of isolation or ease of multiplexing when multiple different music sources need be distributed to multiple line circuits. For example, multiple transmitters utilizing different carrier frequencies to convey different music signals can more easily share the air waves than a wired facility.

Conclusion

While the embodiment discussed comprised one music transmitter unit and one music receiver unit, the invention is not confined to such limited use but can be used with any number of music transmitter or receiver units. In addition, as shown in FIG. 1, the system can function with any distribution of music receivers and/or option sockets together in a key telephone line circuit panel.

It is obvious that the invention disclosed need not be provided on an option basis but could be incorporated in the design of the key telephone line units. In addition, the music signal can be switched across the hold resistor rather than constantly being applied across the hold resistor.

Although the music distribution system utilized analog modulation techniques the invention does not preclude the use of either an analog carrier with a digital representation of the music signal or an all digital system. In addition, transmission techniques such as time or frequency multiplexing could be used to facilitate the distribution of multiple different music signals to multiple line circuits. The invention is not limited in scope to the transmission of music or entertainment signals, but could be used for the distribution of any analog or digital signals whether it be voice, video, data or combinations thereof. The invention enables the application of carrier technology to the distribution of signals within the key telephone systems.

Although specific embodiments of the music transmitter and receiver have been disclosed, other embodiments known to those skilled in the art could provide the same function without deviating from the scope of our invention.

What is claimed is:

1. A signal distributing arrangement for providing information signals to selected key telephone line circuits when in the active noncommunicating mode, said distributing arrangement comprising:
    transmitter means common to said line circuits for encoding information signals onto a carrier signal resulting in an encoded carrier signal,
    means for distributing said encoded carrier signal to each said line circuit,
    a receiver associated with each said selected line circuit said receiver comprising,
    means for isolating said encoded carrier signal from other signals on said distributing means,
    means for decoding said encoded carrier signal to obtain said information signals, and
    means for applying said information signals to a central office telephone line connected to said associated line circuit.

2. The invention of claim 1 wherein said means for distributing utilizes radio transmission from said transmitter.

3. The invention of claim 1 wherein said means for distributing utilizes existing common line circuit wiring.

4. The invention of claim 3 wherein said common wiring provides the battery voltage for said line circuits.

5. The invention of claim 1 wherein said encoded carrier signal simultaneously conveys different information signals.

6. The invention of claim 1 wherein different ones of said encoded carrier frequencies convey different information signals.

7. The invention of claim 1 wherein said encoded carrier is a modulated radio frequency carrier.

8. The invention of claim 7 wherein said modulated radio frequency carrier is a frequency modulated carrier.

9. The invention of claim 1 wherein said receiver contains switching means for interrupting said information signal flow to said associated line circuit.

10. The invention of claim 1 wherein said applying means includes means for connecting said information signals in a balanced mode to a line associated with said line circuit.

11. The invention of claim 10 wherein said applying means includes means for operating in parallel with the hold impedance of said associated line circuit.

12. A line circuit for use in a key telephone system, said line circuit adapted for connection between a subscriber station and a telephone line from a switching network, and adapted for providing loop current flow and an information signal on said line when said associated subscriber station is in the active noncommunicating mode, said information signal being received as a modulated radio frequency carrier signal, said line circuit comprising:
   means for isolating said received modulated radio frequency carrier signal from received other signals,
   means for demodulating said isolated radio frequency carrier signal to obtain a resultant information signal;
   means for amplifying said resultant information signal, and
   means for applying said amplified information signal across said telephone line from said switching network associated with said line circuit.

13. The invention of claim 12 wherein said line circuit includes means for receiving said modulated radio frequency carrier signal over common wiring between said line circuits.

14. The invention of claim 15 13 said modulated radio frequency carrier signal is a frequency modulated carrier.

15. The invention of claim 12 wherein said applying means includes means for connecting said information signals in a balanced mode to the line associated with said line circuit.

16. The invention of claim 15 wherein said applying means includes means for connecting in parallel with the hold impedance of said line circuit.

17. The invention of claim 16 wherein said line circuit contains switching means for optionally disabling the reception of said information signals.

18. The invention of claim 12 wherein said line circuit operates unilaterally on said information signals.

19. A receiver circuit adapted for use with a key telephone line circuit for providing information signals to said line circuit when said line circuit is in the active noncommunicating mode, said receiver circuit comprising:
   means for connection to a communication pair from a switching network said communication pair associated with said key telephone line circuit,
   means for isolating an encoded carrier signal from received other signals,
   means for decoding said encoded carrier signal into an information signal, and
   means for applying said information signal to said communication pair associated with said line circuit.

20. The invention of claim 19 wherein said connection means is a direct replacement for an option socket of said line circuit.

21. The invention of claim 20 wherein said connection means includes a connection to the power leads and wherein said encoded carrier signals are received from said power leads.

22. The invention of claim 21 wherein said receiver is powered from voltages available on said power leads.

23. The invention of claim 19 wherein said receiver includes means for receiving said encoded carrier signal via radio transmission.

24. The invention of claim 19 wherein said connection means includes means for connecting said information signal in a balanced mode to said line circuit.

25. The invention of claim 24 wherein said connection means for connecting said information signals in parallel with the hold impedance of said line circuit.

26. The invention of claim 25 wherein said receiver circuit includes switching means for optionally disabling the reception of said encoded carrier signals.

27. The invention of claim 19 wherein said receiver circuit operates unilaterally on said information signals.

* * * * *

UNITED STATES PATENT AND TRADEMARK OFFICE
CERTIFICATE OF CORRECTION

PATENT NO. : 4,149,042

DATED : April 10, 1979

INVENTOR(S) : Gerry C. Balzer and Alexander Feiner

It is certified that error appears in the above—identified patent and that said Letters Patent are hereby corrected as shown below:

Column 1, line 18, "like" should read --line--; line 24, "limit" should read --line--. Column 3, line 13, delete "now U. S. Patent No. 4,057,693,"; line 63, after "Ser. No. 708,857" add --which is now U. S. Patent No. 4,057,693--. Column 6, line 36, "much" should read --music--. Column 7, line 41, "avaiable" should read --available--; line 45, "ciruict" should read --circuit--. Column 9, line 39, ";" should read --,--; line 49, "15 13" should read --13 wherein--.

FIG. 4, change designator "451" to --4S1--.

Signed and Sealed this

Twenty-fifth Day of March 1980

[SEAL]

Attest:

SIDNEY A. DIAMOND

Attesting Officer

Commissioner of Patents and Trademarks